United States Patent [19]

Misch et al.

[11] 3,732,620
[45] May 15, 1973

[54] METHOD OF TREATING PLASTIC AND ELASTOMERIC MATERIALS AND ARTICLES PRODUCED THEREBY

[75] Inventors: Robert D. Misch, Donald A. Daus, both of Chicago, Ill.

[73] Assignee: MBT Corporation, Chicago, Ill.

[22] Filed: June 9, 1971

[21] Appl. No.: 151,242

Related U.S. Application Data

[60] Division of Ser. No. 8,530, Feb. 4, 1970, Pat. No. 3,637,416, and a continuation-in-part of Ser. No. 636,258, May 5, 1967, which is a continuation-in-part of Ser. Nos. 473,212, July 19, 1965, abandoned, and Ser. No. 524,454, Feb. 2, 1966, abandoned, which is a continuation-in-part of Ser. No. 231,299, Oct. 17, 1962, abandoned.

[52] U.S. Cl. ..................................................32/2
[51] Int. Cl. ...........................................A61c 13/00
[58] Field of Search ..................32/2, 8; 117/72, 117/63, 33.3, 76 F, 94, 106 A, 107, 138.8 UA, 138.8 F, 161; 29/132; 26/807, 351

[56] References Cited

UNITED STATES PATENTS

| | | | |
|---|---|---|---|
| 2,474,061 | 6/1949 | Moulton | 117/121 X |
| 2,502,286 | 3/1950 | Sowa | 161/206 X |
| 3,249,464 | 5/1966 | Nelson et al | 117/124 F X |
| 3,628,988 | 12/1971 | Stol | 117/63 |

*Primary Examiner*—Robert Peshock
*Attorney*—Sidney Wallenstein et al.

[57] ABSTRACT

A method of improving the surface characteristics of plastics and elastomers which in its preferred aspects includes the steps of forming a bonding or coupling film on the surface of a plastic or elastomeric material and thereafter contacting the film with a compound or a mixture of compounds, or a solution thereof, capable of forming a deposit or coating of silica or silica gel thereon, and articles produced in accordance with the method.

3 Claims, 1 Drawing Figure

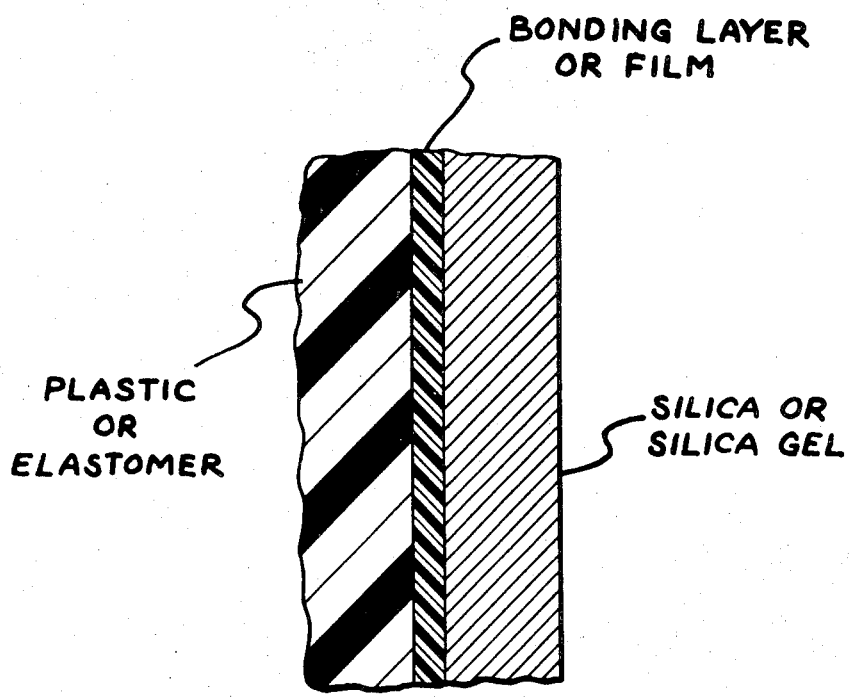

METHOD OF TREATING PLASTIC AND ELASTOMERIC MATERIALS AND ARTICLES PRODUCED THEREBY

This is a division of application Ser. No. 8,530, filed Feb. 4, 1970 and now U.S. Pat. No. 3,637,416 issued Jan. 25, 1972, and a continuation-in-part application of co-pending application Ser. No. 636,258, filed May 5, 1967, which application is a continuation-in-part application of applications Ser. No. 473,212, filed July 19, 1965, now abandoned, and Ser. No. 524,454, filed Feb. 2, 1966, now abandoned, said last mentioned application, in turn, being a continuation-in-part application of Ser. No. 231,299, filed Oct. 17, 1962, now abandoned.

This invention relates to a method of improving the surface characteristics of plastics and elastomeric materials, and to articles produced in accordance with the method aspects of the invention.

The significant cost advantages realized from the use of plastics in place of other materials in many areas have long been recognized. An excellent example of this can be found in the manufacture of clear plastic lenses. Generally speaking, such lenses are fabricated of commercial grades of polymethyl methacrylate utilizing machining, hot pressing, or injection molding techniques. The ease of machining cast acrylics enables large lenses to be manufactured at a tenth of the cost of a glass lens of corresponding size. Smaller lenses of the order of three inches in diameter, or less, made by injection molding, also enable important cost advantages to be gained over the fabrication of similar size lenses from glass. Over and above the foregoing advantages afforded by the use of plastics in the area of lens manufacture, molded plastic lenses can be formed with an aspherical lens surface having improved optical performance and, in addition, enable mounting rings and brackets to be incorporated at the time of molding thereby facilitating assembly of the lenses. As a result, an optically superior lens can be molded at a lower cost than a comparable glass lens which must be ground to size. Also, the use of plastics enables the manufacture of compound lenses by combining plastics materials, such as polystyrene and a polycarbonate, having different indexes of refraction. In the area of corrective ophthalmic lenses, use of plastics such as diethyleneglycol bis (allyl carbonate) can be made to produce lenses of excellent clarity, dimensional stability and chemical resistance. In addition to the foregoing attributes, such lenses have the advantage of being light in weight and resistant to shattering. Thick lenses, as required in cataract cases, can be more easily tolerated by the wearer, and can be made at a fraction of the cost of a similar glass lens.

Despite the many advantages accruing from the use of plastics in the plastic lens field, they have a number of shortcomings which has retarded their widespread acceptance and use. Chief among these is their susceptibility to scratching whenever the lens is touched or rubbed to clean the surface. In fact, it has been found that accepted methods of cleaning plastic lenses do as much harm to the surface of the lens as good. Dust wiped across the surface with a disposable tissue, for example, will invariably leave tiny scratches on the surface. These scratches produce light scattering and reduce light transmission. Even worse, as the lens surface is observed to deteriorate, the natural reaction is to rub the surface even more until it becomes obvious that the operation is self-defeating. To compound the difficulty, rubbing induces a static charge which attracts dust. Tiny abrasive particles of dust adhere to the plastic surface and leave scratches on the surface when they are moved around by a cloth or a disposable tissue. This inherent susceptibility of conventional plastic lenses, especially plastic contact and spectacle lenses, to surface damage, giving rise to a shortened useful life, obviously places an ever-reoccurring financial burden on the wearers thereof. A further problem involved in the use of conventional plastic contact lenses, in particular, resides in the fact that the wetting agents commonly used with such lenses last only long enough for the lens to be positioned on the eye. They then dissolve in the tear fluid. A "dry" lens can be a considerable source of discomfort and will also tend to accumulate sebacious secretions which are oily in character. A discontinuous film of tear fluid on a contact lens will advance and recede unevenly upon blinking and will detract from optimum vision.

Yet another field in which the surface properties of plastics materials has a direct effect on their overall utility is the plastic denture field. Substantial progress has been made over the years in the art and technology of fabricating and fitting plastic dentures. Despite the present high level of development of this area of prosthetic dentistry, a significant number of denture wearers encounter difficulties with them. While the factors which contribute to prosthetic intolerance and denture failures vary, investigation has shown that the poor wettability properties of the polymeric materials used to make dentures is a major contributing factor. The fundamental reason for the poor wettability properties of such materials is attributable, in the main, to their low surface energies. Liquids, including saliva, will not spread well on low surface energy solids. This property of polymeric materials for denture use results in the formation of air pockets between the mouth parts of the wearer against which the denture is held and the opposed surfaces of the denture. These air pockets can disrupt denture fit and reduce retention, resulting in discomfort to the wearer. Concomitant denture problems growing out of this property of polymeric materials, used in making dentures, are the tendency of certain foodstuffs to adhere to the dentures, causing staining and denture breath.

Further in this same connection, one of the most promising plastics for glazing is polycarbonate. It is the toughest of all transparent plastics, with high impact strength over a wide range of temperature. It also has a high heat deflection temperature, dimensional stability, self-extinguishing properties and is easily fabricated. These properties, as well as its relatively light weight, make it well suited for aircraft applications. The big drawback to this plastic is the ease with which it can be scratched. Deterioration in surface quality can be seen even after wiping with a clean, soft cloth.

Other areas where the surface characteristics of plastics present problems are plastic Petri dishes, plastic balls used in certain hydrometers, and in vacuum metallizing. Plastic Petri dishes are relatively inexpensive and can be disposed of after a single use. In addition, they are essentially non-breakable as compared to glass and can be made with a planar bottom having optics superior to glass. Despite these advantages, the growth of tissue culture is very unsatisfactory in polystyrene Petri dishes because the tissue samples, for some reason, cannot attach to the bottom of the dish as they do in the case of glass. The cells, therefore, degenerate and die. In the case of polyethylene balls used in certain hydrometers, the surface of the balls has poor wettability properties which results in a delayed, or even an inaccurate, reading. In vacuum metallizing field, the most generally used metal is aluminum. In numerous instances, the adhesion of the evaporated aluminum to the surface of a plastic employed for this purpose is inadequate and peeling or blistering occurs.

Yet another field wherein the surface properties of particular materials place limitations on the manner in which articles made therefrom are used is in lithography. The damping system employed in offset printing generally comprises a water pan to hold the fountain solution and a series of rollers, including a ductor roller and a damping form roller (herein referred to as dampening rollers), for transferring the fountain solution to the pressplate. The core of the dampening rollers is provided with a cushion or sleeve fabricated of soft rubber or other suitable elastomeric material. In order to maintain a proper amount of moisture on the printing surface of the press-plate, the rubber cushion or sleeve of the dampening rollers heretofore was covered with a water absorbent body in the form of either a molleton cover or sleeve, a high wet-strength paper cover, a shrinkable fiber tube, or the like. These water absorbent bodies, while being capable of wetting the surface of the pressplate, have a number of disadvantages. Thus, for example, molleton covers or sleeves, apart from their relatively high cost, and the time and labor required in applying them to, and removing them from, the rollers, tend to pick up ink from the pressplates. To avoid excessive build up of ink on the covers of sleeves, it is necessary, at regular intervals, particularly with damping form rollers, to wash the covered rollers in a machine with water and a detergent. In time, however, even this practice will not overcome the problem and the molleton covers or sleeves must be discarded. Furthermore, in operation, the fibers of molleton covers or sleeves must be well matted so that they will stay swollen with water. If the fibers stick up and dry out, they will take up ink and the covers or sleeves will be rendered useless.

Paper covers, while less costly than molleton covers or sleeves, tend like molleton covers or sleeves, to take up ink. Unlike molleton covers or sleeves, however, they cannot be washed and must be thrown away. Paper covers also are susceptible to tearing, cracking and blistering. In addition, spirally wound paper covers leave seam and pattern marks on the printed surface.

Shrinkable fiber tubes, like molleton covers or sleeves, are relatively costly. Apart from this shortcoming, care must be taken to assure that the fiber tubes are evenly shrunk on the dampening rollers. Uneven shrinking leads to uneven distribution of fountain solution on the pressplates and, ultimately, to an unsatisfactory end product.

In accordance with the present invention, there is provided a method which overcomes the aforementioned disadvantages attributable to the surface properties of plastics and elastomeric materials. Plastic articles such as plastic lenses and "PLEXIGLASS" windows, and the like, treated by the method are provided with surfaces which are harder and far more resistant to scratching than the plastic of which they are made. The surfaces, moreover, are substantially permanent in character and, in many instances, can improve the light transmission properties thereof by acting as anti-reflection coatings. Plastic ophthalmic lenses, particularly contact lenses, do not need pre-treatment with a wetting solution or lubricant, and do not require immersion in a soaking solution after they are removed from the eyes of the wearer. Plastic dentures produced by the method of this invention eliminate, or at least substantially reduce, the incidence of prosthetic intolerance and denture failure attributable largely to the poor wettability properties of the polymeric materials utilized to make the dentures. The dentures have a natural feel which makes them highly compatible with oral tissue. The amount of friction resulting from movement of the dentures produced by the method of this invention with relation to the denture-contacting mouth parts of the wearer is greatly reduced. The formation of air pockets between the oral tissue against which the dentures are held and the opposed surfaces of the denture is, in large measure, eliminated, enabling the dentures to be more firmly and comfortably maintained in proper position in the mouth. The surface of the dentures, furthermore, resists adhesion of stain and odor-causing substances, and moreover, materially facilitates cleaning of the dentures. The dentures of this invention, in addition, are especially suited to wearers who have dry mouths, such as diabetics, and in those cases where a normal acrylic denture produces an "allergic" reaction, this condition has been appreciably alleviated.

Petri dishes treated by the method of this invention enable tissue cultures to grow in normal fashion. Plastic balls where used in hydrometers have greatly improved wettability characteristics. In the field of vacuum metallizing, the method enables metals to be deposited on plastic surfaces either by vacuum evaporation or by sputtering techniques. The metal thus deposited is strongly adhered to the surface of the plastic and has greatly improved resistance to peeling and blistering even under the most adverse conditions.

In addition, the method of this invention provides dampening rollers for use in offset printing which completely eliminates the need for molleton covers or sleeves, paper covers, shrinkable fiber tubes, or the like, and the concomitant problems associated with their use in connection with dampening rollers. The method of this invention, furthermore, enables extremely close and accurate control of the ink/water balance in the damping system of offset printing presses to be attained while at the same time permitting a cut back of at least 50% of the amount of moisture needed to keep the pressplates clean. The method enables dampening rollers to be treated, without the need for specialized equipment or training, in a matter of minutes with minimal effort on the part of an operator.

Apart from the foregoing aspects of the invention, surfaces provided with a coating as taught herein manifest greater conductivity and ability to discharge static electricity. The antistatic coatings of this invention have particular utility, for example, in the case of large, clear plastic items where dust collection is noticeable due to surface illumination. Other items where such a coating is of value are indicating needles and illuminated dials. Commercial antistats heretofore used in this connection are water soluble and one wiping with a damp cloth will remove them. The coatings produced by the method of this invention retain their antistatic properties even after numerous washings and dryings.

Briefly, the present invention involves the interposition of a thin, continuous polymeric bonding film or layer composed of one or more ambifunctional silanes between the surface of a plastic or elastomeric material substrate and a deposit or coating of silica or silica gel. In accordance with the preferred method aspects of the invention, the polymeric bonding film or layer is formed by contacting the surface of a plastic or elastomeric material with a hydrolyzable bonding or coupling film-forming organic silicon compound of the type mentioned. The thus treated surface is then contacted with a second hydrolyzable silicon compound to effect formation of the layer, coating, film or deposit of silica or silica gel on the bonding film. The polymeric bonding film or layer is bonded to the surface of the plastic or elastomeric substrate through the action of one or more organic functional groups of the silane and at the same time is bonded to the silica or silica gel layer through Si—O—Si bonds, where one silicon is bonded directly to a carbon atom of the silane and the other silicon is a constituent of the silica layer. Hydrolyzation of the silicon compounds advantageously is carried out at ambient temperatures and humidity conditions. The method, in essence, provides a silica or silica gel deposit on a plastic or elastomeric substrate surface which is stabilized at the surface-silica or silica gel interface by the polymerized bonding film or layer. The result is that the normal hydrophilic or water-attracting nature of silica does not tend to bring about loosening or detachment of the silica or silica gel deposit because water is repelled from the interface and cannot penetrate under the coating or deposit.

The stabilized coating can be applied by any of various known techniques including, for example, dipping, brushing, swabbing, wiping, spraying, or by controlled vapor-deposition techniques. The procedure will, in large measure, depend upon the nature of the finished article and the use to which it is to be put. Thus, for example, the manner of applying the coating to a plastic lens, or optical element will differ, generally speaking, from the techniques used to apply the coating on the moisture distribution rollers employed in offset or lithographic printing, or a denture, or a plastic surface to be metallized. With the former articles, carefully controlled vapor-deposition techniques, generally, are required, whereas with moisture distribution rollers, a simple swabbing, dipping, or wiping procedure can be used.

The method of the present invention may be carried out in a variety of ways. Illustrative procedures which have been found to be satisfactory may be outlined broadly as follows:

1. A two-step procedure which involves first applying to a surface to be treated an organic silicon compound having organic as well as silicon functionality and capable of forming a continuous polymeric bonding film, layer or coating on the surface, followed by forming a silica or silica gel deposit, film, layer or coating on the first formed film or layer by effecting hydrolysis of a suitable silicon compound on said first formed film or layer.

2. By an essentially one-step procedure which involves applying a unitary or single blend or mixture of bonding film-forming and silica or silica gel depositing organic silicon compounds to a surface to be treated. Through differential evaporation and hydrolysis, a stabilized silica or silica gel coating is formed on the treated surface.

The bonding or coupling film-forming organic silicon compounds having utility for the purposes of this invention are silanes characterized by having three hydrolyzable groups on the silicon and one non-hydrolyzable organic radical which is attached to the silicon by means of a carbon-silicon bond and which contains one or more functional groups which are capable of reacting in some way at temperatures where the plastic or elastomeric substrate would not be damaged. Structurally, these compounds can be represented by the following formulas:

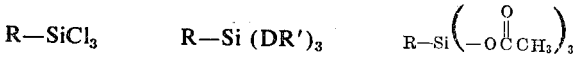

wherein R is an organic radical with at least one reactive group which can either react chemically or will interact sufficiently strongly with the molecular structure of the plastic or the elastomer to promote adhesion or bonding to the plastic or elastomeric surface. Exemplary of such radicals are vinyl, allyl, or alkyl, the alkyl radical having at least one of methacryloxy, amino, epoxy, or mercapto groups thereon, and having at least two carbon atoms and being bonded to the silicon. The hydrolyzable group —OR', may be alkoxy, particularly methoxy, ethoxy, or beta-methoxy-ethoxy. Methoxy and ethoxy are preferred because the alcohols which are produced by hydrolysis are more volatile. Acetoxy, as shown, is also a useful hydrolyzable group. Although the class of compounds is quite limited in that all have one silicon atom and one silicon-carbon bond considerable diversification is possible in the organic functional group.

Representative of ambifunctional silanes falling into this class are vinyltrichlorosilane, vinyltrimethoxysilane, vinyltriethoxysilane, gamma-methacryloxypropyltrimethoxysilane, vinyltriacetoxysilane, allyltrichlorosilane, allyltrimethoxysilane, allyltriethoxysilane, allyltriacetoxysilane, butadienyltrichlorosilane, butadienyltriethoxysilane, crotyltrichlorosilane, crotyltriethoxysilane, vinyl tris (2-methoxyethoxy) silane, gamma-glycidoxypropyltrimethoxysilane, beta-3,4 (epoxycyclohexyl) ethyltrimethoxysilane, n-(trimethoxysilylpropyl) ethylenediamine, gamma-aminopropyltriethoxysilane, gamma-mercaptopropyltrimethoxysilane, and the like, and compatible mixtures thereof. This group of compounds can produce, upon hydrolysis, siloxane resins which can bond to silica or silica gel.

The compounds useful for the purpose of this invention in bringing about formation of a silica or silica gel deposit on the bonding film or layer comprise two groups. One of the groups is made up of silicon halides having four halogen groups bonded to silicon. Exemplary of such compounds are tetrachlorosilane, tetrabromosilane, trichlorobromosilane, dibromodichlorosilane, tribromochlorosilane, trichloroiodosilane, and the like, and compatible mixtures thereof. Of this group of compounds tetrachlorosilane is preferred both from an economic and a practical standpoint.

The other group of compounds coming within this category are silicic esters characterized in that, upon hydrolysis in the presence of a suitable catalyst, they are capable of forming a silica or silica gel coating or deposit. Silicic esters especially suitable for this purpose are the tetraalkoxysilanes or alkyl silicates exemplified by tetramethylorthosilicate, tetraethylorthosilicate, tetrapropylorthosilicate, tetraisopropylorthosilicate, tetrabutylorthosilicate, tetraisobutylorthosilicate, tetraamylorthosilicate, beta-chloroethylorthosilicate, tetraallylorthosilicate, and the like, and compatible mixtures thereof. Of this group of compounds tetraethylorthosilicate is preferred.

As indicated hereinabove, various procedures can be employed to treat the surfaces of materials in accordance with the method of the present invention. One such procedure is to use an appropriate organofunctional silane, or mixture of silanes, in full-strength application by swabbing or flooding the surface. Excess silane can be removed by wiping or, if the silane bonds sufficiently well to the plastic, for example, it can be removed by rinsing the surface with a suitable solvent. This method works best with silanes where the hydrolyzable groups on the silicon do not react rapidly with water. Because chlorosilanes react so rapidly with water vapor their application by swabbing or flooding can result in uneven laydown of a polysiloxane film under normal humidity conditions. An alternate procedure is to use an appropriate organofunctional silane, or mixture of silanes, in dilute solutions for application by swabbing or by immersion and withdrawal techniques. This is especially desirable where a silane has somewhat inconvenient wetting or viscosity characteristics. The organic solvent used in forming the dilute solutions of the silicon compounds desirably should be inert with respect to both the material of which the article is made and to the compound, or compounds, employed. In addition, the solvent advantageously should have a vapor pressure sufficiently high to permit evaporation at room temperature or under moderate heat. Exemplary of organic solvents having utility for this purpose are hexane, xylene, trichlorotrifluoroethane, and the like. The concentration of the silicon compound in the organic solvent is variable. Generally speaking, the compound will comprise from about 0.25 to 10, usually about 0.5 to 1, weight percent of the solvent solution. The following are specific examples of organic solvent solutions of organic silicon compounds suitable for application, as by swabbing, on various plastic or elastomeric substrates:

1. Bonding or coupling agent solutions:
   a. 0.5 weight percent of allyltrichlorosilane in trichlorotrifluoroethane.
   b. 1 weight percent of allyltriethoxysilane in ethanol.
   c. 5 weight percent of vinyltriethoxysilane in ethanol.
2. Silica or silica gel deposit-forming solutions:
   a. 5 weight percent of tetrachlorosilane in xylene.
   b. 5 weight percent of tetrachlorosilane in trichlorotrifluoroethane.
3. Combined silica or silica gel deposit-forming solutions:
   a. 3 percent, by weight, tetramethylorthosilicate and 3 percent, by weight, tetrachlorosilane in hexane.
   b. 1 percent, by weight, tetraethylorthosilicate and 5 percent, by weight, tetrachlorosilane in trichlorotrifluoroethane.

Upon application of a solvent solution to an article, the solvent evaporates and a residue of the silicon compound is left on the surface. The silicon compound will then hydrolyze to an extent dependent on two factors: (1) the amount of water vapor in the ambient atmosphere and (2) the reactivity of the hydrolyzable groups of the silicon compound. In air, for example having a relative humidity above about 10 percent, hydrolysis of silicon halides is quite rapid at room temperature. On the other hand, if the hydrolyzable groups are alkoxy groups, as in the case of silicic esters, the silicon compound will not hydrolyze readily under the same conditions. In the latter instance, it has been found that hydrolysis can be promoted or catalyzed by adding a small quantity of a silicon halide such as tetrachlorosilane, for example, to the pure silicic ester or organic solvent solution thereof prior to its application to a surface to be treated.

Another, and especially preferred procedure for treating articles such as plastic ophthalmic lenses and optical elements involves first applying a deposit, coating, layer or film of a film-forming bonding agent, and then a deposit, coating layer or film of silica or silica gel to an article by vapor deposition. The technique employed in exposing the articles to the vapors of the bonding agent and the coating agent can be varied. Excellent results can be attained, for example, by utilizing pressurized dry air or an inert gas such as nitrogen, or argon. A common source of the carrier gas can be used in this connection to convey, first, the bonding agent to a suitable chamber containing an article or articles to be treated, and, then, the coating agent alone, or in admixture with water vapor to the chamber. A manifold arrangement can be used for this purpose and flow regulators can be provided for the various conduits thereby permitting the use of a wide range of vapor concentrations. A typical coating sequence employing dry air as the carrier and using a two liter chamber is as follows:

|  | Flow rate | Time |
|---|---|---|
| Dry air | 10 liters/min. | 1 min. |
| Bonding Vapor | 4 liters/min. | 1 min. |
| Bonding Vapor | no flow | 1 min. |
| Air (50% R.H.) | 4 liters/min. | 1 min. |
| Coating vapor | 4 liters/min. | 1 min. |
| Air (50% R.H.) | 4 liters/min. | 4 min. |
| Dry air | 10 liters/min. | 1 min. |

The higher flow rates at the beginning and end of the procedure are designed, first, to lower the initial humidity level and, second, to flush out coating agent vapors and gaseous by-products.

Following deposition of the bonding or coupling film on the article, the vapors of the bonding film-forming agent are flushed from the chamber with air having the suggested humidity. The moisture which is introduced into the chamber in this way prepares the chamber for the next step in which air containing a saturation concentration of a hydrolyzable silicon compound, such as, for example, tetrachlorosilane, is drawn through the chamber. A mixture of water vapor and the silicon compound vapors is produced in this way and is sufficient to provide a silica or silica gel deposit having the desired properties. As a final step, the remaining silicon compound vapors are flushed out with air.

The article, with the fresh deposit, coating, layer or film of silica or silica gel thereon, advantageously is allowed to "cure" for from 1 hour to a day. This treatment imparts long-term adherence and durability to the coating and can be effectively carried out at ambient temperatures, or can be accelerated at elevated temperatures of the order of 50° to 100°C.

As indicated, hereinabove, the foregoing technique also enables vapors of the coating agent and water vapor to be injected simultaneously after the bonding step. This practice permits the build up of a much thicker silica layer which is highly scratch resistant. In this practice, the location of the water vapor injection point with reference to the object to be coated is an important consideration. The air containing the water vapor must be directed so as to impinge on the surface to be coated by the coating agent. By way of illustration, the coating agent vapor is injected at a rate of about 2 liters/min. through one inlet of a chamber containing an article which has been exposed to the bonding agent vapor while simultaneously injecting at substantially the same rate air having a relative humidity of about 40 percent. Coatings of the type described are produced in from 1 to 15 seconds by this technique.

Another procedure which can produce coatings of uniform thickness at low cost involves pairing a bonding solution dip with a particular type of vapor coating dip.

Lenses or other molded parts of "PLEXIGLAS" (Rohm and Haas) acrylic 811 (V100) are first racked securely and then cleaned. If such parts have not been allowed to accumulate dust after molding they will not need any special cleaning. Such parts must either be coated soon after molding or stored in polyethylene bags. With precautions to avoid contamination, either no cleaning or a rinse with a pure commercial grade of trichlorotrifluoroethane such as Du Pont TF is sufficient to prepare the parts.

The racked parts are then dipped in a solution which comprises about 0.25 percent gamma-mercaptopropyltrimethoxysilane in trichlorotrifluoroethane. The parts are immersed rapidly, agitated gently, then removed at a uniform speed of 20 in./min. The rack is then moved over to a coating chamber where silica is uniformly deposited by cycling the parts with continuous motion through a coating zone.

Coating is accomplished by lowering and raising the parts at a slow uniform speed through a coating zone maintained above the surface of a layer of tetrachlorosilane vapor which forms a flat surface because of its weight. The tetrachlorosilane vapor is continually renewed by pumping fresh vapor at or near saturation concentration into a tank open at the top at a rate where fresh vapor is rising at about 1 inch per minute. As this rising vapor reaches the rim of the chamber it spills out at the space between the chamber top and an upper baffle, thus maintaining a flat surface and forming a horizontal coating zone. This horizontal coating zone is approximately 2 inches in thickness above the line where tetrachlorosilane spills off. The coating rates diminish rapidly above and below the zone. All the humidity to form the coating is supplied by the layer of room air above the tetrachlorosilane plenum.

The rack of parts, which can be lenses, is lowered slowly through this horizontal zone and then raised, stopping only momentarily at the bottom of the cycle. The "dip" nature of this operation and its mechanical similarity to the bonding step are extremely advantageous for low-cost automated production.

The linear speed in the coating step will depend on the humidity of the room air. At 40 percent R.H. and 75°F, specimens have been very satisfactorily coated with a uniform blue interference color at a speed of 20 in./min., with 1 ½ min. for the entire coating cycle.

Coatings having edge to edge color uniformity can be produced in this manner on irregular surfaces which are very difficult to coat uniformly in any other way. Another advantage of this method is that there is no need to clean or maintain inlets for air containing water vapor. Clogging of such inlets can be a problem in other vapor mixing procedures.

Relatively high humidities are preferred for this procedure because at lower humidities additional cycling through the coating zone or lower cycling speeds will be required. Useful coatings can be produced in the range from 25 to 60 percent R.H. but 40 to 50 percent R.H. is preferred.

The surface permeation characteristics of articles treated by the method of the present invention is an important consideration in providing the surface of the article with a suitable deposit or film. With hard surfaces, or those having low permeation characteristics, longer exposure times at elevated temperatures can produce the desired result. By proper selection of the bonding film-forming compound, or compounds, however, the treatment can be carried out at ambient temperatures without prolonged exposure times. Silane monomers containing one organo functional group and three hydrolyzable groups are, for example, suitable for use in treating such surfaces. Compounds containing a double bond such as vinyltrichlorosilane also can be employed. Compounds which have proven useful in combination in this connection are silanes containing epoxy and amino groups. For some purposes they may be advantageously combined in stoichiometric or approximately stoichiometric proportions to effect a reaction between the epoxy and amino groups of the compounds. Exemplary of such combinations are gamma-aminopropyltriethoxysilane and beta-(3,4 epoxycyclohexyl)-ethyltrimethoxy silane in a 1:2 mol ratio, and n-(trimethoxysilylpropyl) ethylenediamine and gammaglycidoxypropyltrimethoxysilane in a 1:3 mol ratio.

As stated previously hereinabove, silicic esters in combination with a suitable catalyst can be used to effect formation of a stabilized silica or silica gel deposit on a treated surface. Of this group of compounds, tetraalkoxysilanes, either singly or in combination, and a catalyst advantageously selected from silicon halides having four halogen groups bonded to silicon are especially suitable. The quantity of the catalyst employed in such solutions is variable. In most instances only minor proportions, of the order of 1 to 6 percent, usually 3 to 5 percent, by weight, of the solution, are required. If an organic solvent is incorporated in the solutions of the silicic esters and the catalysts, it must be used in an amount such as to enable a minimum partial pressure of the organic silicon compound catalyst to be maintained to ensure reaction thereof with water vapor in the ambient atmosphere. Exemplary of such a ternary mixture is one containing 200 ml. of tetraethylorthosilicate or ethyl silicate, 100 ml. of silicon tetrachloride and 100 ml. of trichlorotrifluoroethane.

Another means of achieving this objective with silicic esters is to incorporate varying amounts of a silane, or silanes, selected from the group containing one organic group, characterized by having functionality in one or more positions, bonded directly to silicon through a carbon-silicon bond and three hydrolyzable groups of the halide, ester or acetoxy type. If the hydrolyzable groups are halides, these compounds can serve as a catalyst in lieu of silicon halides or can be substituted for a portion thereof. Examples of compounds which are useful for this purpose are vinyltrichlorosilane, gamma-mercaptopropyltrimethoxysilane, gamma-methacryloxypropyltrimethoxysilane, gamma-glycidoxypropyltrimethoxysilane, beta-3,4 (epoxycyclohexyl) ethyltrimethoxysilane, n-(trimethoxysilylpropyl) ethylenediamine, vinyltriacetoxysilane, gamma-aminopropyltriethoxysilane, allytriethoxysilane, and the like, and compatible mixtures thereof. The amino and epoxy containing silanes are combined in appropriate proportions to effect formation of epoxy compounds as described above. These ambifunctional silanes may be added in varying amounts depending upon other characteristics of the mixture. One factor to be considered is whether the hydrolyzable groups on the ambifunctional silane are halide or alkoxy groups. As indicated above, if they are halide groups, then they are capable of contributing to the catalytic hydrolysis of the silicic esters and the amount of silicon halide employed can be diminished or eliminated.

The action of silicon halides in catalyzing the hydrolysis of silicic esters is believed to result from the ability of these compounds to act as Lewis acids. In the presence of traces of moisture the halides can react to give a proton plus a negatively charged ion complex. The proton is believed to initiate the splitting off of alcohol from the silicic esters which is followed by condensation polymerization. Compounds, other than the silicon halides, capable of achieving this same effect are metal halides examples of which are germanium chloride, stannic chloride, titanium chloride, and the like.

While a two-step procedure for applying the bonding film or layer, and the silica or silica gel, to a plastic or elastomeric material substrate is preferred, it is, as pointed out earlier herein, possible to employ an essentially one-step procedure to achieve this end. In such a procedure, a unitary or single blend or mixture of compatible bonding film or layer forming, and silica or silica gel depositing, silicon compounds is applied, as by dipping, swabbing, brushing, or the like, to a surface. Through differential evaporation and hydrolysis, a stabilized coating is formed on the treated surface. The following blends or mixtures are exemplary of those having utility in a one step procedure:

| | Ingredient | Wt. % |
|---|---|---|
| I. | (a) Silicon tetrachloride | 5 |
| | (b) Trichlorotrifluoroethane | 94 |
| | (c) Gamma-mercaptopropyl-trimethoxysilane | 1 |
| II. | (a) Silicon tetrachloride | 5 |
| | (b) Trichlorotrifluoroethane | 94 |
| | (c) Gamma-glycidoxypropyl-trimethoxysilane | 1 |

The concentration of a bonding compound used in any given application is governed, among other things, by the rate of interaction with the substrate, and the rate of hydrolysis and condensation polymerization of the bonding compound. Dilution has been used in certain instances to effect more uniform application. As indicated above, various inert solvents such as hexane and trichlorotrifluoroethane have proven convenient and effective. The ambifunctional silanes in which the hydrolyzable groups have low rates of hydrolysis in the absence of a catalyst, i.e. methoxy, ethoxy, etc., may be used either full strength or dilute, depending upon the viscosity and volatility. In general, lower molecular weight compounds can be used full-strength, but higher-molecular weight compounds, or those which interact with the substrate at a higher rate, are best diluted with an appropriate solvent such as ethanol. When ambifunctional silanes are used in which the hydrolyzable groups are halides, a full-strength application is less convenient or desirable. On one hand, the vapors of the compound and of the resulting hydrochloric acid are more of a problem when open air application is used. On the other hand, the deposits tend to be overly heavy and close control of the deposition cannot be maintained unless low humidity conditions are present. Full-strength application may also cause surface hardening in elastomers. These disadvantages are lessened to some extent by the use of vapor methods or by dilution for swabbing applications. The non-halide ambifunctional silanes offer maximum bonding when used full-strength in the liquid or vapor form. It is believed that these compounds are most effective when they impregnate a thin surface layer. Subsequently, when exposed to a coating agent with moisture present these compounds are hydrolyzed and can cross-link to form a polymeric sublayer. Organo-functional alkoxy silanes may also serve to protect the elastomer or plastic from the action of silicon halides which tend to have an embrittling action when used directly. In using the method to coat dampening roller, pure vinyltriethoxysilane is used as the first layer and a solution of 1:20 of a coating agent such as silicon tetrachloride in trichlorotrifluoroethane is used as the second coating. This procedure can be used in the open air, but provision for ventilation is desirable.

The capabilities of the described solutions for providing a silica or silica gel deposit on a treated surface, especially an elastomeric surface such as that of a dampening roller, can be enhanced and augmented by incorporating therein a small amount of a colloidal silica. Colloidal silicas which can be used for this purpose are available commercially under the trade designations "Cab-O-Sil" (Cabot Company), "Santocel" (Monsanto), "Nalcoag CD-100" (Nalco Chemical Co.) and "Ludox" (Du Pont). These materials, when added to the solutions, tend to thicken them and, consequently, make the solutions easier to apply as by swabbing. The colloidal silicas, furthermore, facilitate the build-up of the silica or silica gel deposit under conditions of low humidity on such elastomeric surfaces. The amount of colloidal silica added is variable. Generally speaking, optimum results can be obtained with solutions containing, by weight, from about 1 to about 5 percent of the colloidal silica.

The time periods required to attain an effective and adequate deposition of silica or silica gel on the surface of an article in accordance with the practice of the present invention will vary. In utilizing the method to coat such articles as ophthalmic lenses, optical elements or dentures by vapor deposition, excellent results can be attained in anywhere from 5 to 15 minutes. In utilizing the method to coat plastic surfaces preparatory to metallizing, or the elastomeric surface of a moisture distribution roller of the type used in offset printing, the bonding or coupling film-forming agent desirably should be permitted to remain on the surface of the article for a period of about 5 minutes before the silica or silica gel forming agent is applied. The silica or silica gel deposit forming agent, after application, should be allowed to "cure", at ambient temperatures, for a period of from 15 to 30 minutes, more or less.

Generally speaking, it is preferred to carry out the method of this invention in an atmosphere wherein the relative humidity is at least of the order of 10 percent.

The generally optimum objectives of the invention, however, are met with air having a relative humidity in the range of from about 20 to 60 percent, especially desirably from about 25 to 50 percent.

In the accompanying drawing, the figure shown represents an article having a coating thereon formed in accordance with the teachings of the present invention. The thickness of the stabilized silica or silica gel coating will vary in accordance with the nature of the compounds, or solutions thereof, employed, the length of time they are allowed to remain in contact with the article, and the number of applications of the compounds, or solutions thereof, made on a surface. Employing vapor deposition procedures, a coating having a substantially uniform thickness of about 0.01 to 0.1 micron can be obtained on, for example, an optical element in about 10 minutes, more or less, in a single pass through a closed chamber of the type referred to hereinabove. With swabbing, dipping, spraying, or the like, procedures, the thickness of the stabilized coating on any given article will vary appreciably. In most instances, such as in the treatment of offset printing moisture distribution rollers, where the procedure utilized is not as exacting as in the case of vapor deposition, and uniformity of thickness of the film is not an overriding consideration, the attainment of a completely covered surface is the principal criterion. Uncoated areas can be readily distinguished from coated areas because the compounds utilized in the practice of the method tend to form a whitish deposit on the surface of a treated article. This coating is especially prominent in the case of dark colored articles such as moisture distribution rollers and, of course, facilitates complete covering of the treated surface.

While in accordance with the preferred practice of the present invention, a bonding agent is first applied to a plastic or elastomeric surface, it has been discovered that in certain instances wettable surfaces can be produced simply by applying an undiluted coating agent such as, for example, silicon tetrachloride, directly on a surface to be treated. The capabilities of a compound of the type disclosed herein for attaining this effect are dependent, in large measure, upon the relative hardness of the surface to which the compound is applied. If, for instance, the surface of a high density polyethylene or polypropylene plastic is so treated, a deposit will form but does not stand up under water immersion and mild rubbing. If, on the other hand, the surface of a low density plastic of the type referred to is treated, as by swabbing, with such a compound, the resulting coating is much more adherent and can withstand rubbing for a short time. Similar results have been obtained with unplasticized and plasticized polymethylmethacrylate and elastomers of different durometers. The softer materials will take and hold a coating much better than hard materials. The difference is ascribed to the greater permeability of the less dense materials which gives the coating a mechanical bond to the surface. In this connection, good results have been obtained with polyethylenes having a density of the order of 0.910 to 0.925 gm/cc.

Apart from thoroughly removing foreign matter such as dirt, grease or oil from the surface to be treated, no special procedures, other than those taught herein, are required to practice the method of the present invention.

The foregoing detailed description has been presented for purposes of explanation only and no unnecessary limitation should be understood therefrom, it being understood that various changes may be made in the manner of carrying out the invention, all within the spirit of the guiding principles and teachings provided herein.

What is claimed is:

1. A synthetic plastic denture having improved wearer tolerance characteristics, comprising a synthetic plastic denture, and an intimately bonded silica or silica gel deposit on the surface of the denture which is stabilized at the surface-deposit interface by a polymer of an organic silicon compound characterized by having an organic group with functionality in one or more positions bonded directly to the silicon through a carbon-silicon bond and three hydrolyzable groups bonded to silicon, said deposit being clear, and substantially water insoluble and having greater wettability properties than the synthetic plastic of the denture thereby to improve the wearer tolerance characteristics of the denture.

2. A denture as claimed in claim 1 wherein the interface comprises a polysiloxane of a hydrolyzable unsaturated hydrocarbon-substituted silane.

3. A denture as claimed in claim 2 wherein the silane is allyltrichlorosilane.

* * * * *